(12) United States Patent
Deng

(10) Patent No.: US 9,035,640 B2
(45) Date of Patent: May 19, 2015

(54) HIGH EFFICIENT CONTROL CIRCUIT FOR BUCK-BOOST CONVERTERS AND CONTROL METHOD THEREOF

(71) Applicant: Chengdu Monolithic Power Systems Co., Ltd., Chengdu (CN)

(72) Inventor: Chenggang Deng, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 14/289,169

(22) Filed: May 28, 2014

(65) Prior Publication Data

US 2014/0354250 A1    Dec. 4, 2014

(30) Foreign Application Priority Data

May 28, 2013   (CN) .......................... 2013 1 0204458

(51) Int. Cl.
*H02M 3/158* (2006.01)
*H02M 3/157* (2006.01)
(52) U.S. Cl.
CPC ............ *H02M 3/1582* (2013.01); *H02M 3/157* (2013.01)
(58) Field of Classification Search
USPC ................................................ 323/282–290
See application file for complete search history.

(56) References Cited

U.S. PATENT DOCUMENTS

| | | | | |
|---|---|---|---|---|
| 7,952,900 | B2* | 5/2011 | Tomiyoshi et al. ............. | 363/98 |
| 2006/0043943 | A1* | 3/2006 | Huang et al. .................. | 323/222 |
| 2009/0021227 | A1* | 1/2009 | Sase et al. ..................... | 323/238 |
| 2012/0119715 | A1* | 5/2012 | Loikkanen et al. ........... | 323/235 |

* cited by examiner

*Primary Examiner* — Jessica Han
(74) *Attorney, Agent, or Firm* — Perkins Coie LLP

(57) ABSTRACT

A controller used in a buck-boost converter includes a clock generator, an error amplifying circuit, a comparing circuit, a proportional sampling circuit, a logic circuit, a pulse width increasing circuit, first and second driving circuits. Based on a clock signal generated by the clock generator, the proportional sampling circuit samples the difference between a current sensing signal and a compensation signal generated by the error amplifying circuit, and generates a proportional sampling signal. The pulse width increasing circuit generates a sum control signal based on the proportional sampling signal and a logic control signal generated by the logic circuit, wherein a modulation value adjusted by the proportional sampling signal is added to the pulse width of the logic control signal to generate the pulse width of the sum control signal. The first and second driving circuits generate driving signals based on the sum control signal and the logic control signal.

18 Claims, 13 Drawing Sheets

HIGH EFFICIENT CONTROL CIRCUIT FOR BUCK-BOOST CONVERTERS AND CONTROL METHOD THEREOF

CROSS-REFERENCE TO RELATED APPLICATION(S)

This application claims the benefit of CN application 201310204458.4, filed on May 28, 2013, and incorporated herein by reference.

TECHNICAL FIELD

The present invention generally relates to electronic circuits, and more particularly but not exclusively to control circuits for buck-boost converters and control methods thereof.

BACKGROUND

Nowadays, portable electronic products become smaller and lighter, which has accordingly decreased the volume and capacity of their batteries. As a result, the efficiency of power supply modules needs to be improved. Furthermore, the power supply modules need to provide a stable output voltage when the battery voltage varies in a wide range, so as to improve the endurance of the batteries. Buck-boost converters which can work in a wide input range are widely used in these applications.

FIG. 1 illustrates a traditional buck-boost converter with four switches. The buck-boost converter converts an input voltage VIN into an output voltage VOUT. It comprises switches S1~S4, an inductor L and an output capacitor C. Energy is stored in the inductor L when the switches S1, S3 are turned on and the switches S2, S4 are turned off. The energy stored in the inductor L is provided to a load when the switches S1, S3 are turned off and the switches S2, S4 are turned on. Since the switches S1~S4 keep switching during the operation, the power loss of the traditional buck-boost converter is large.

To reduce the power loss, different working modes may be utilized according to the relationship between the input voltage VIN and the output voltage VOUT. When the input voltage VIN is smaller than the output voltage VOUT, the buck-boost converter works in a BOOST mode. The switch S1 is maintained on and the switch S2 is maintained off. The switches S3 and S4 are controlled through pulse width modulation. When the input voltage VIN is larger than the output voltage VOUT, the buck-boost converter works in a BUCK mode. The switch S4 is maintained on and the switch S3 is maintained off. The switches S1 and S2 are controlled through pulse width modulation.

In the method mentioned above, since the working mode is determined by the relationship between the input voltage and the output voltage, the relationship between the control loop and the feedback loop is complicated, which brings difficulties to system design and test. Furthermore, circuit parameters (such as voltage, current and duty cycle) suffer from sudden changes during the mode transition, which may induce spike on the output voltage.

SUMMARY

Embodiments of the present invention are directed to a controller used in a buck-boost converter, wherein the buck-boost converter converting an input voltage into an output voltage comprises a first switch, a second switch, a third switch, a fourth switch and an inductor. The controller comprises a clock generator, an error amplifying circuit, a comparing circuit, a proportional sampling circuit, a logic circuit, a pulse width increasing circuit, a first driving circuit and a second driving circuit. The clock generator is configured to generate a periodical clock signal. The error amplifying circuit is configured to generate a compensation signal based on a reference signal and a feedback signal representative of the output voltage. The comparing circuit coupled to the error amplifying circuit is configured to compare a current sensing signal representative of the current flowing through the inductor with the compensation signal, and generate a reset signal. The proportional sampling circuit is coupled to the clock generator and the error amplifying circuit, wherein based on the clock signal, the proportional sampling circuit samples the difference between the current sensing signal and the compensation signal, and generates a proportional sampling signal. The logic circuit is coupled to the clock generator and the comparing circuit, wherein the logic circuit is configured to generate a logic control signal based on the clock signal and the reset signal. The pulse width increasing circuit is coupled to the proportional sampling circuit and the logic circuit. The pulse width increasing circuit is configured to generate a sum control signal based on the proportional sampling signal and the logic control signal, wherein the pulse width increasing circuit increases the pulse width of the logic control signal by a modulation value to generate the pulse width of the sum control signal, and the modulation value is adjusted by the proportional sampling signal. The first driving circuit is coupled to the pulse width increasing circuit, wherein based on the sum control signal, the first driving circuit generates a first driving signal and a second driving signal to respectively control the first switch and the second switch. The second driving circuit is coupled to the logic circuit, wherein based on the logic control signal, the second driving circuit generates a third driving signal and a fourth driving signal to respectively control the third switch and the fourth switch.

Embodiments of the present invention are also directed to a control method of a buck-boost converter, wherein the buck-boost converter converting an input voltage into an output voltage comprises a first switch, a second switch, a third switch, a fourth switch and an inductor. The control method comprises: sensing the output voltage and generating a feedback signal; sensing the current flowing through the inductor and generating a current sensing signal; generating a compensation signal based on a reference signal and the feedback signal; comparing the current sensing signal with the compensation signal and generating a reset signal; generating a logic control signal based on a clock signal and the reset signal; sampling the difference between the current sensing signal and the compensation signal based on the clock signal and generating a proportional sampling signal; generating a sum control signal based on the proportional sampling signal and the logic control signal, wherein the pulse width of the sum control signal is equal to the sum of the pulse width of the logic control signal and a modulation value adjusted by the proportional sampling signal; generating a first driving signal and a second driving signal based on the sum control signal to respectively control the first switch and the second switch; and generating a third driving signal and a fourth driving signal based on the logic control signal to respectively control the third switch and the fourth switch.

In the embodiments of the present invention, the buck-boost converter automatically and smoothly switches among different modes based on the proportional sampling signal and the pulse width of the logic control signal. Circuit parameters (such as voltage, current and duty cycle) are continuous and smooth during the mode transition. System design and test also become easier. Moreover, since the buck-boost converter does not need extra input voltage feedback circuit or mode detection circuit, the volume and cost of the system is decreased. The reliability of the system is enhanced, too.

BRIEF DESCRIPTION OF THE DRAWINGS

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
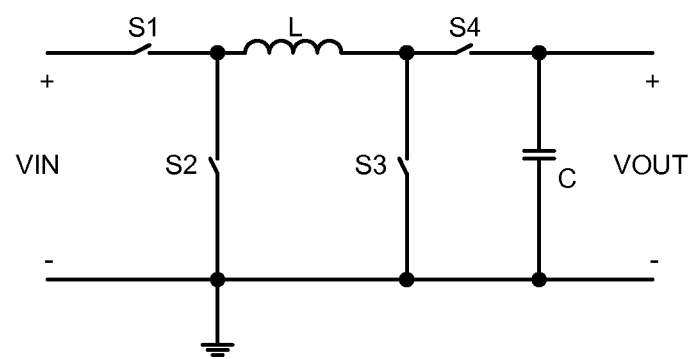
FIG. 1 illustrates a traditional buck-boost converter with four switches.
Figure 2:
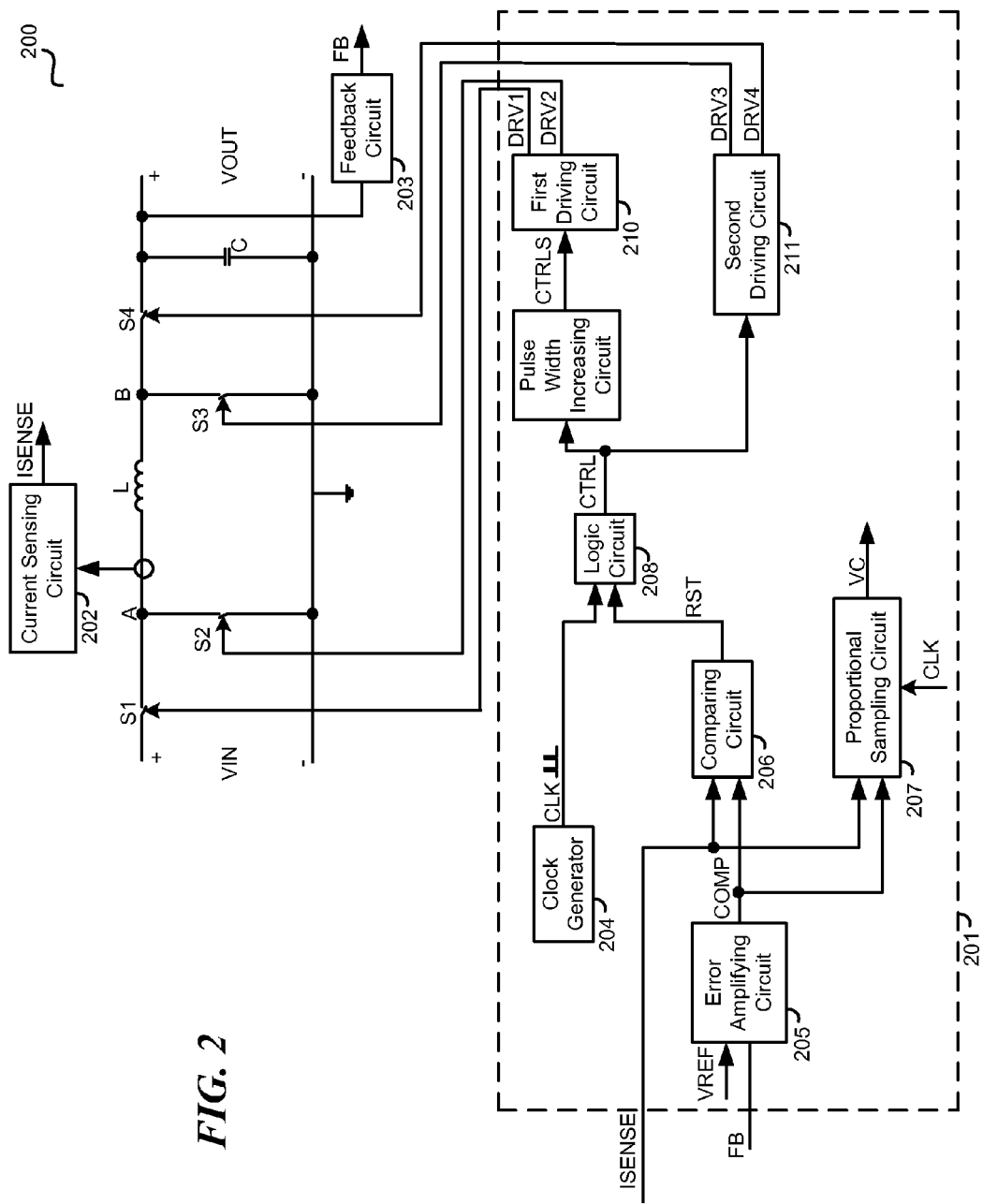
FIG. 2 is a block diagram of a buck-boost converter 200 in accordance with an embodiment of the present invention.

FIG. 2 is a block diagram of a buck-boost converter 200 in accordance with an embodiment of the present invention. The buck-boost converter 200 comprises switches S1~S4, an inductor L, an output capacitor C, a controller 201, a current sensing circuit 202 and a feedback circuit 203. The switch S1 has a first terminal, a second terminal and a control terminal, wherein the first terminal is configured to receive an input voltage VIN. The switch S2 has a first terminal, a second terminal and a control terminal, wherein the first terminal is coupled to the second terminal of the switch S1, the second terminal is grounded. The inductor L has a first terminal (node A) and a second terminal (node B), wherein the first terminal is coupled to the second terminal of the switch S1 and the first terminal of the switch S2. The switch S3 has a first terminal, a second terminal and a control terminal, wherein the first terminal is coupled to the second terminal of the inductor L, the second terminal is grounded. The switch S4 has a first terminal, a second terminal and a control terminal, wherein the first terminal is coupled to the second terminal of the inductor L and the first terminal of the switch S3, the second terminal is configured to provide an output voltage VOUT. The output capacitor C is coupled between the second terminal of the switch S4 and the reference ground. The switches S1~S4 may be any controllable semiconductor devices, such as MOSFETs, IGBTs and so on.

The current sensing circuit 202 is configured to sense the current flowing through the inductor L and generate a current sensing signal ISENSE. The current sensing circuit 202 may utilize any suitable current sensing devices, such as current sensing resistor, current sensor, current mirror and so on. The current sensing circuit 202 may directly sense the current flowing through the inductor L. It may also sense the current flowing through the switch S1 to get the current sensing signal ISENSE.

The feedback circuit 203 is coupled to the second terminal of the switch S4. It senses the output voltage VOUT and generates a feedback signal FB. The controller 201 is coupled to the current sensing circuit 202 and the feedback circuit 203. Based on the current sensing signal ISENSE and the feedback signal FB, the controller 201 generates driving signals DRV1~DRV4 to respectively control the switches S1~S4. The controller 201 may be an integrated circuit, or be partially or fully composed of discrete electronic components.

As shown in FIG. 2, the controller 201 comprises a clock generator 204, an error amplifying circuit 205, a comparing circuit 206, a proportional sampling circuit 207, a logic circuit 208, a pulse width increasing circuit 209, a first driving circuit 210 and a second driving circuit 211. The clock generator 204 is configured to generate a periodical clock signal CLK. The error amplifying circuit 205 is coupled to the feedback circuit 203, and is configured to generate a compensation signal COMP based on a reference signal VREF and the feedback signal FB. The error amplifying circuit 205 may be any digital or analog circuit with error proportional integration function.

The comparing circuit 206 is coupled to the current sensing circuit 202 and the error amplifying circuit 205. The comparing circuit 206 is configured to compare the current sensing signal ISENSE with the compensation signal COMP and generate a reset signal RST.

The proportional sampling circuit 207 is coupled to current sensing circuit 202, the clock generator 204 and the error amplifying circuit 205. Based on the clock signal CLK, the proportional sampling circuit 207 samples the difference between the current sensing signal ISENSE and the compensation signal COMP, and generates a proportional sampling signal VC. In an embodiment, the proportional sampling circuit 207 samples the difference between the current sensing signal ISENSE and the compensation signal COMP at the rising edge (or high level) of the clock signal CLK. The proportional sampling signal VC may be expressed as $VC=k1*(ISENSE_{vally}-COMP)$, wherein k1 is a proportional coefficient, $ISENSE_{vally}$ is the minimum value (valley value) of the current sensing signal ISENSE in one switching period. In some embodiments, the proportional coefficient k1 should be properly selected. If k1 is too large, there will be oscillation in the control loop. If k1 is too small, the transient response of the buck-boost converter will be poor.

The logic circuit 208 is coupled to the clock generator 204 and the comparing circuit 206, wherein the logic circuit 208 is configured to generate a logic control signal CTRL based on the clock signal CLK and the reset signal RST. Generally, the logic control signal CTRL is changed from logical low into logical high at the rising edge of the clock signal CLK, and is changed from logical high into logical low when the current sensing signal ISENSE is increased to reach the compensation signal COMP. In an embodiment, if the current sensing signal ISENSE keeps larger than or equal to the compensation signal COMP, which means $ISENSE_{valley} \geq COMP$, the logic control signal CTRL will maintain low and its pulse width TON will be zero.

The pulse width increasing circuit 209 is coupled to the proportional sampling circuit 207 and the logic circuit 208. The pulse width increasing circuit 209 is configured to generate a sum control signal CTRLS based on the proportional sampling signal VC and the logic control signal CTRL, wherein the pulse width increasing circuit 209 increases the pulse width TON of the logic control signal CTRL by a modulation value TTH to generate the pulse width TONS of the sum control signal CTRLS, and the modulation value TTH is adjusted by the proportional sampling signal VC. In an embodiment, the modulation value TTH is constant when the proportional sampling signal VC is smaller than zero ($ISENSE_{valley} < COMP$), and varies reversely with the proportional sampling signal VC when the proportional sampling signal VC is larger than zero ($ISENSE_{valley} \geq COMP$).

The pulse width increasing circuit 209 may be any analog or digital circuit which can increase the pulse width. Since the pulse width TONS of the sum control signal CTRLS should be larger than or equal to zero, and smaller than or equal to the period T of the logic control signal CTRL, the pulse width TONS of the sum control signal CTRLS is limited to T when TON+TTH is larger than T.

The first driving circuit 210 is coupled to the pulse width increasing circuit 209, wherein based on the sum control signal CTRLS, the first driving circuit 210 generates driving signals DRV1 and DRV2 to respectively control the switches S1 and S2. The driving signals DRV1 and DRV2 are generally complementary. To prevent shoot through, the first driving circuit 210 may comprise a dead time control circuit to induce dead time between the driving signals DRV1 and DRV2.

The second driving circuit 211 is coupled to the logic circuit 208, wherein based on the logic control signal CTRL, the second driving circuit 211 generates driving signals DRV3 and DRV4 to respectively control the switches S3 and S4. The driving signals DRV3 and DRV4 are generally complementary. To prevent shoot through, the second driving circuit 211 may comprise a dead time control circuit to induce dead time between the driving signals DRV3 and DRV4.

A buck-boost converter working in CCM (continuous current mode) will be analyzed below as an example. However, persons skilled in the art can recognize that, similar analysis may also be applicable to buck-boost converters working in DCM (discontinuous current mode).

Figure 3A:
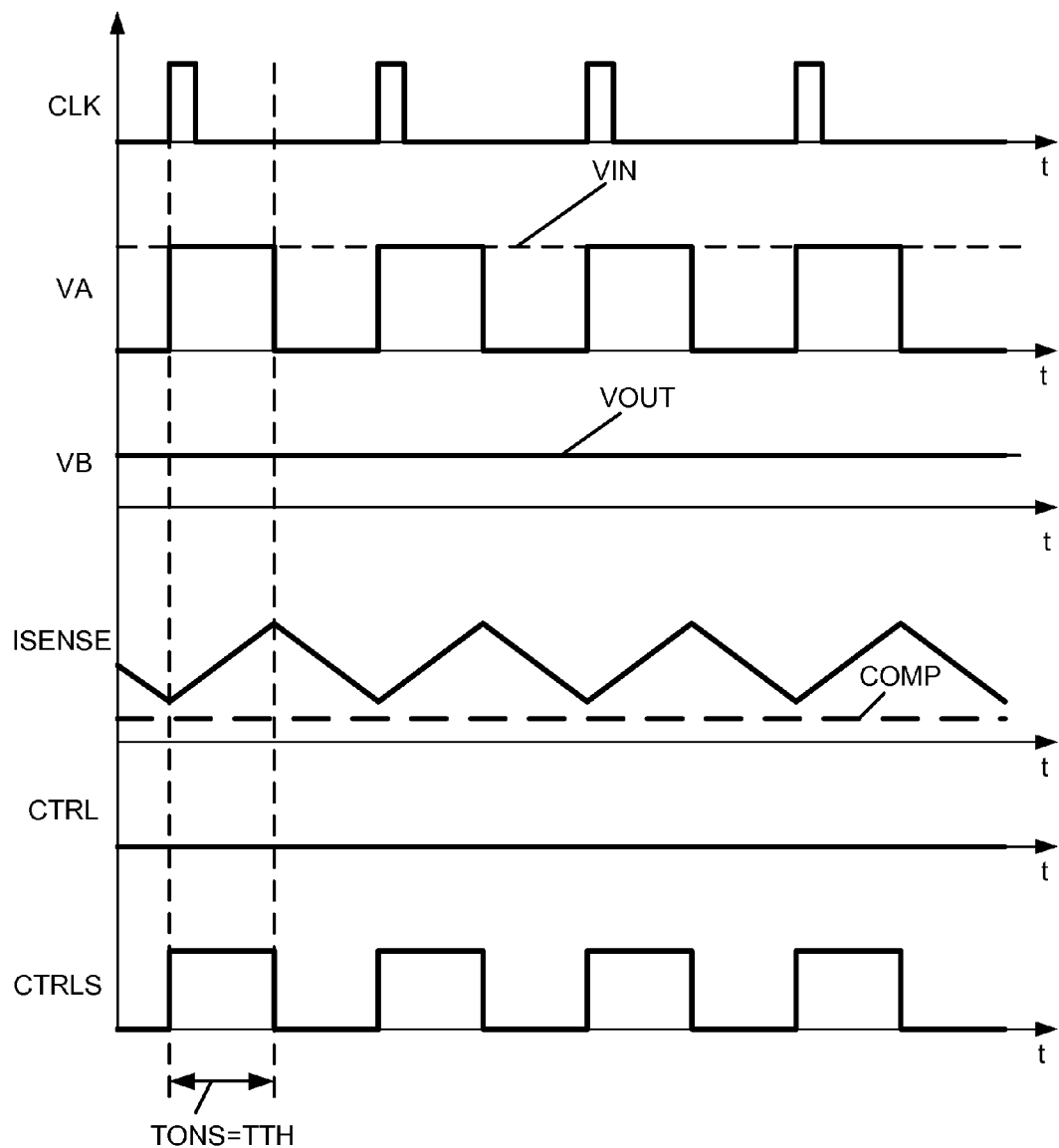
FIG. 3A-3C illustrate the working waveforms of the buck-boost converter 200 shown in FIG. 2 in accordance with an embodiment of the present invention.

When the pulse width TON of the logic control signal CTRL is zero, which means TON=0, the buck-boost converter 200 works in BUCK mode. FIG. 3A illustrates the working waveforms of the buck-boost converter 200 in BUCK mode. The valley value $ISENSE_{valley}$ of the current sensing signal ISENSE is larger than the compensation signal COMP, the logic control signal CTRL is maintained low. The switch S3 is maintained off and the switch S4 is maintained on, the voltage VB at node B is equal to the output voltage VOUT. Since $ISENSE_{valley}$ is larger than COMP, the proportional sampling signal VC is larger than zero. The pulse width TONS of the sum control signal CTRLS is equal to the modulation value TTH, and varies reversely with the proportional sampling signal VC. The voltage VA at node A is switched between the input voltage VIN and the zero voltage based on the sum control signal CTRLS. According to the voltage-second balance law, we can get:

$$VIN * TTH / T = VOUT \quad \text{(Formula 1)}$$

Figure 3B:
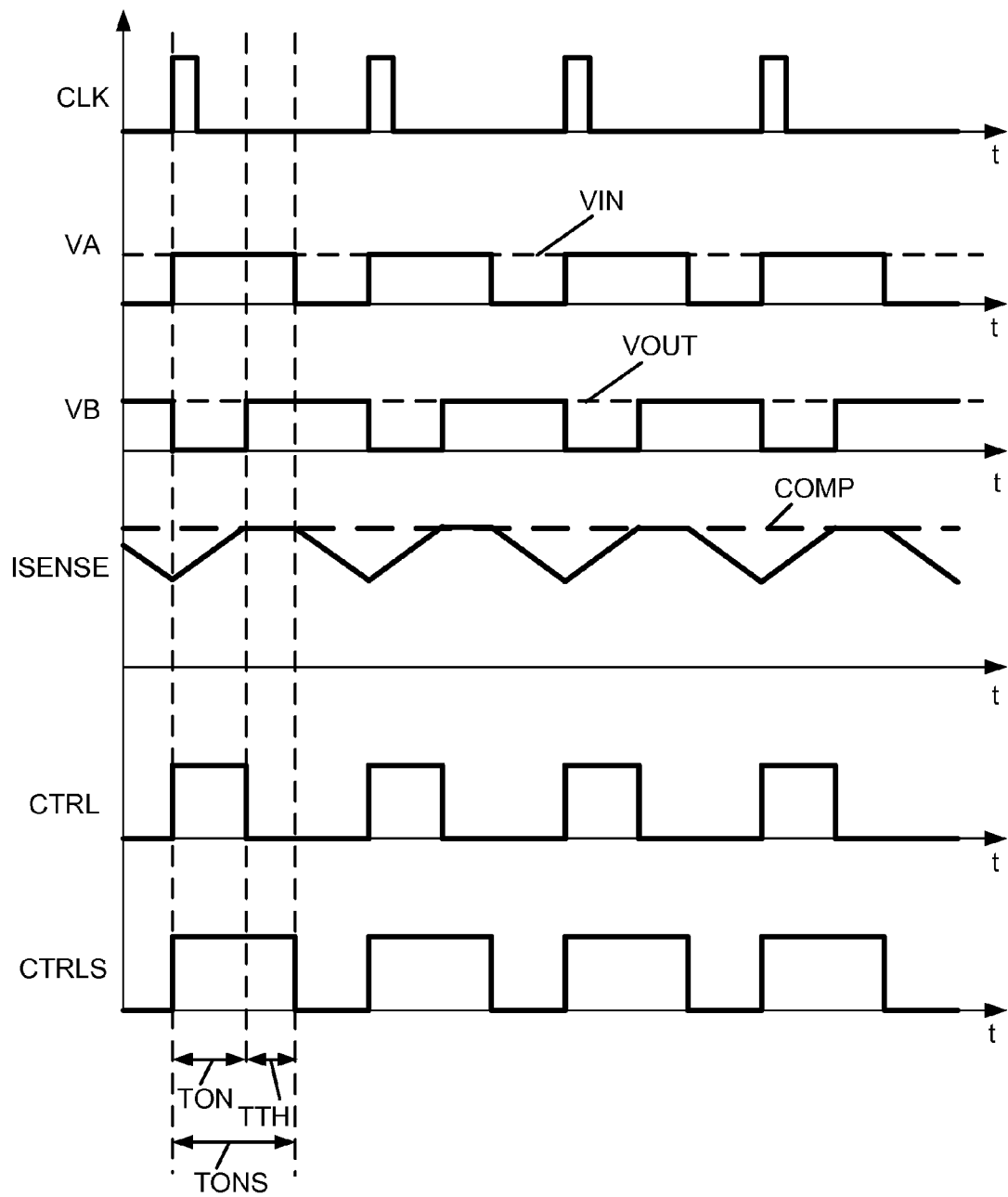

When 0<TON<(T−TTH), the buck-boost converter 200 works in BUCK-BOOST mode. FIG. 3B illustrates the working waveforms of the buck-boost converter 200 in BUCK-BOOST mode. The valley value $ISENSE_{valley}$ of the current sensing signal ISENSE is smaller than the compensation signal COMP. At the rising edge of the clock signal CLK, the logic control signal CTRL is changed from logical low into logical high. The switches S1 and S3 are turned on, the switches S2 and S4 are turned off. The current sensing signal ISENSE as well as the current flowing through the inductor L gradually increases. When the current sensing signal ISENSE is increased to reach the compensation signal COMP, the logic control signal CTRL is changed from logical high into logical low. The switches S3 is turned off and the switches S4 is turned on. Since $ISENSE_{valley}$ is smaller than COMP, the proportional sampling signal VC is smaller than zero, the modulation value TTH is constant. The pulse width TONS of the sum control signal CTRLS is equal to TON+TTH. The switches S1~S4 all keep switching during the operation. The voltage VA at node A is switched between the input voltage VIN and the zero voltage based on the sum control signal CTRLS. The voltage VB at node B is switched between the zero voltage and the output voltage VOUT based on the logic control signal CTRL. According to the voltage-second balance law, we can get:

$$VIN * (TON+TTH) / T = VOUT * (1-TON/T) \quad \text{(Formula 2)}$$

Figure 3C:
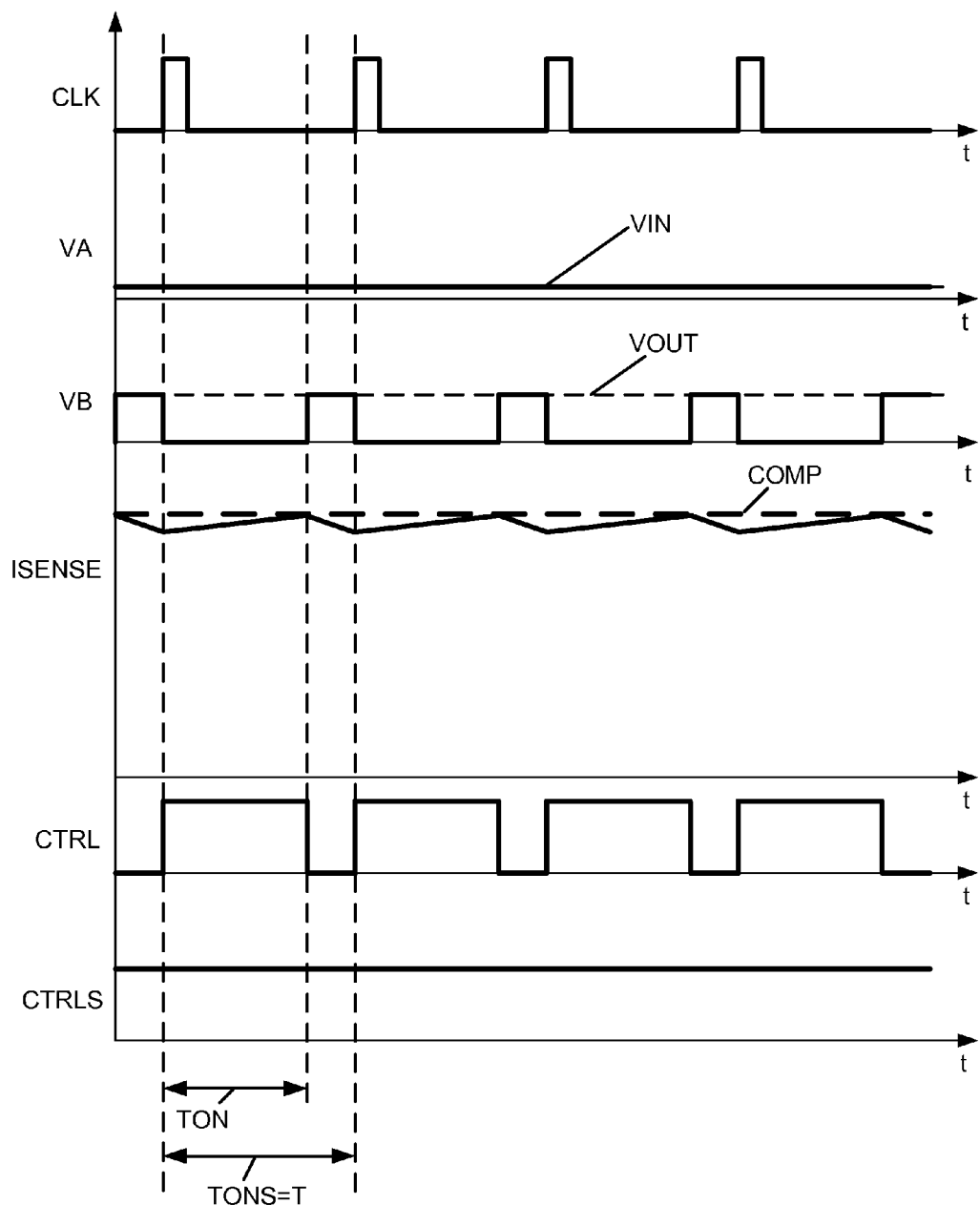

When TON≥(T−TTH), the pulse width TONS of the sum control signal CTRLS is limited to T. The buck-boost converter 200 works in BOOST mode. FIG. 3C illustrates the working waveforms of the buck-boost converter 200 in BOOST mode. The sum control signal CTRLS is maintained high. The switch S1 is maintained on and the switch S2 is maintained off. The voltage VA at node A is equal to the input voltage VIN. At the rising edge of the clock signal CLK, the logic control signal CTRL is changed from logical low into logical high. The switch S3 is turned on, the switches S4 is turned off. The current sensing signal ISENSE as well as the current flowing through the inductor L gradually increases. When the current sensing signal ISENSE is increased to reach the compensation signal COMP, the logic control signal CTRL is changed from logical high into logical low. The switches S3 is turned off and the switches S4 is turned on. The voltage VB at node B is switched between the zero voltage and the output voltage VOUT based on the logic control signal CTRL. According to the voltage-second balance law, we can get:

$$VIN = VOUT * (1-TON/T) \quad \text{(Formula 3)}$$

Based on the proportional sampling signal VC and the pulse width TON of the logic control signal CTRL, the buck-boost converter 200 can automatically and smoothly switch among the BUCK mode, BOOST mode and BUCK-BOOST mode. Circuit parameters (such as voltage, current and duty cycle) are continuous and smooth during the mode transition. System design and test also become easier. Moreover, since the buck-boost converter 200 does not need extra input voltage feedback circuit or mode detection circuit, the volume and cost of the system is decreased. The reliability of the system is enhanced, too.

Tradeoff between efficiency and smooth mode transition should be considered when the constant value of the modulation value TTH is selected. The larger the constant value, the higher the efficiency, but the mode transition is easier to be affected by the input and output voltage. Generally, the constant value is larger than zero, and smaller than the period T of the logic control signal CTRL.

Figure 4:
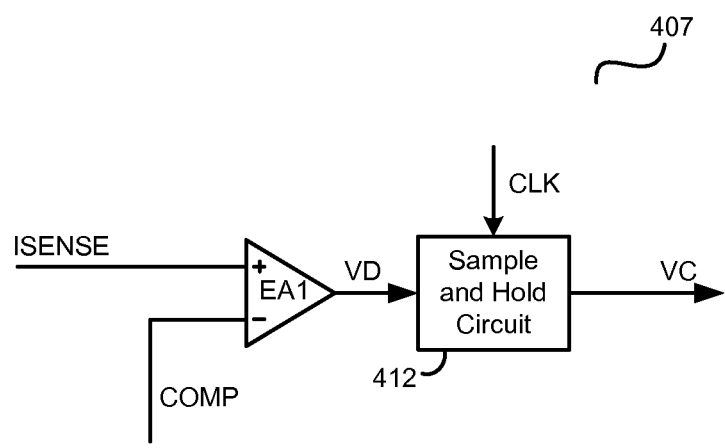
FIG. 4 schematically illustrates a proportional sampling circuit 407 in accordance with an embodiment of the present invention.

FIG. 4 schematically illustrates a proportional sampling circuit 407 in accordance with an embodiment of the present invention. The proportional sampling circuit 407 comprises an error amplifier EA1 and a sample and hold circuit 412. The error amplifier EA1 has a non-inverting input terminal, an inverting input terminal and an output terminal, wherein the non-inverting input terminal is coupled to the current sensing circuit to receive the current sensing signal ISENSE, the inverting input terminal is coupled to the error amplifying circuit to receive the compensation signal COMP. Based on the current sensing signal ISENSE and the compensation signal COMP, the error amplifier EA1 generates a proportional error signal VD at the output terminal. The sample and hold circuit 412 has a first input terminal, a second input terminal and an output terminal, wherein the first input terminal is coupled to the output terminal of the error amplifier EA1 to receive the proportional error signal VD, the second input terminal is coupled to the clock generator to receive the clock signal CLK. The sample and hold circuit 412 samples and holds the proportional error signal VD at the rising edge (or high level) of the clock signal CLK, and generates the proportional sampling signal VC at the output terminal.

Figure 5:
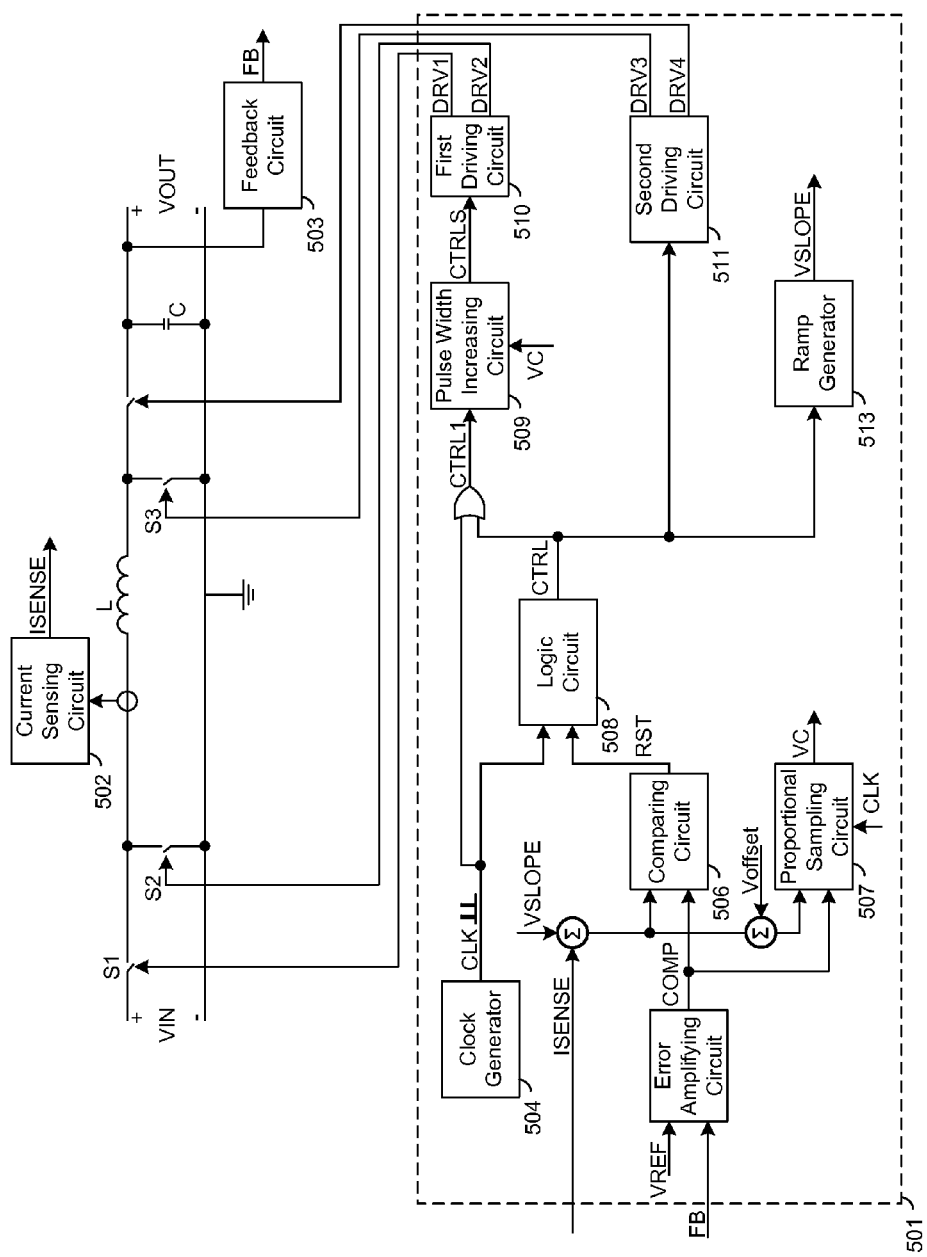
FIG. 5 schematically illustrates a buck-boost converter 500 in accordance with an embodiment of the present invention.

FIG. 5 schematically illustrates a buck-boost converter 500 in accordance with an embodiment of the present invention. The buck-boost converter 500 is similar to the buck-boost converter 200 shown in FIG. 2. In fixed-frequency peak current control, there may be sub-harmonic oscillation at the output voltage when the duty cycle is larger than 0.5. To eliminate the sub-harmonic oscillation, a ramp signal VSLOPE is added to the current sensing signal ISENSE in accordance with an embodiment of the present invention. A sum of the ramp signal VSLOPE and the current sensing signal ISENSE is provided to the comparing circuit 506 and the proportional sampling circuit 507.

The ramp signal VSLOPE is generally a periodical triangular signal or saw-tooth signal. However, since the pulse width TON of the logic control signal CTRL is zero in BUCK mode, the duty cycles of the switches S1 and S2 are mainly determined by the proportional sampling signal VC instead of the peak inductor current. So, slope compensation is not necessary in BUCK node. The ramp signal VSLOPE may be zero in BUCK mode to reduce power loss and enhance control precision. In the embodiment shown in FIG. 5, the controller 501 further comprises a ramp generator 513. The ramp generator 513 is coupled to the logic circuit 508, and is configured to generate the ramp signal VSLOPE based on the logic control signal CTRL. When the pulse width TON of the logic control signal CTRL is zero, the ramp signal VSLOPE is also equal to zero.

In some applications, the signal sent into the pulse width increasing circuit needs to have a minimum pulse width TON_MIN to ensure normal operation of the pulse width increasing circuit. In an embodiment as shown in FIG. 5, the controller 501 further comprises an OR gate OR1. The OR gate OR1 has a first input terminal, a second input terminal and an output terminal, wherein the first input terminal is coupled to the clock generator 504 to receive the clock signal CLK, the second input terminal is coupled to the logic circuit 508 to receive the logic control signal CTRL, and the output terminal is coupled to the pulse width increasing circuit 509 to provide a first control signal CTRL1. The pulse width of the clock signal CLK is set to be equal to the minimum pulse width TON_MIN. In other embodiments, the OR gate OR1 is not necessary, the logic control signal CTRL may have the minimum pulse width TON_MIN (e.g. through maintaining the logic control signal CTRL high when the clock signal CLK is logical high). Then the logic signal CTRL is sent into the second driving circuit 511 after further processing to make sure the buck-boost converter 500 can work in BUCK mode.

In real applications, when the valley value $ISENSE_{valley}$ of the current sensing signal ISENSE is increased to be slightly larger than the compensation signal COMP, which means the buck-boost converter 500 enters into BUCK mode from BUCK-BOOST mode, the proportional sampling signal VC may still be zero or even negative because of the internal characteristic of the proportional sampling circuit 507 (such as a negative offset of its input stage). The pulse width TON of the logic control signal CTRL is zero and the modulation value TTH is constant, the pulse width TONS of the sum control signal CTRLS is also constant and becomes out of control. Thus the output voltage VOUT cannot be regulated and has spikes during the mode transition. To solve the problem mentioned above, in the embodiment shown in FIG. 5, an offset signal Voffset is added to an input terminal of the proportional sampling circuit 507. Based on the clock signal CLK, the proportional sampling circuit 507 samples the difference between ISNSE+VSLOPE+Voffset and the compensation signal COMP and generates the proportional sampling signal VC. For the buck-boost converter 500 shown in FIG. 5, the proportional sampling signal VC can be expressed as $VC=K1*(ISENSE_{valley}+VSLOPE+Voffset-COMP)$. When the proportional sampling signal VC is larger than or equal to zero, which means $(ISENSE_{valley}+VSLOPE+Voffset) \geq COMP$, the pulse width TONS of the sum control signal CTRLS is TON+TTH, wherein the modulation value TTH varies reversely with the proportional sampling signal VC. Thanks to the offset signal Voffset, the pulse width TONS of the sum control signal CTRLS is variable with the proportional sampling signal VC before the buck-boost converter enters into BUCK mode from BUCK-BOOST mode, which makes the mode transition smoother.

Figure 6:
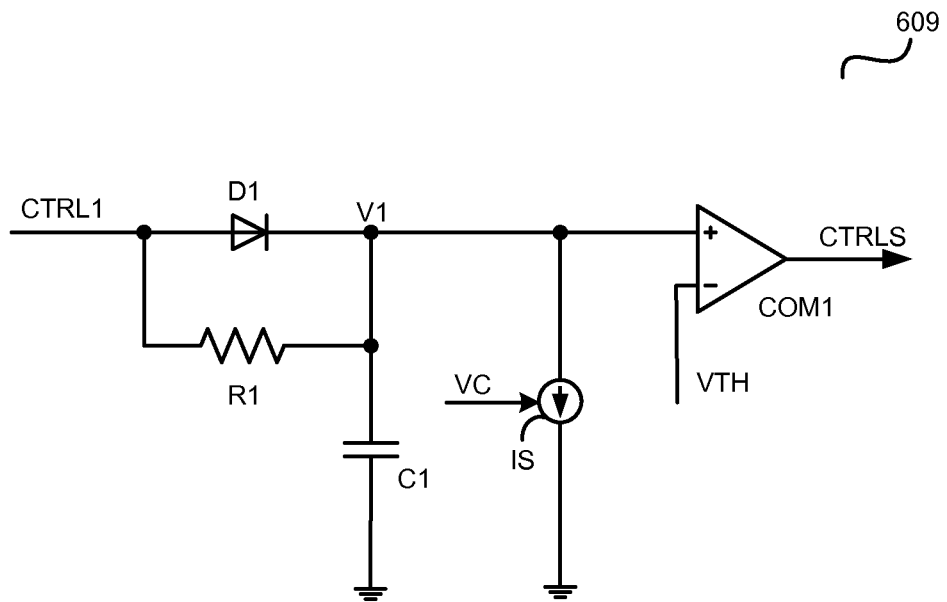
FIG. 6 schematically illustrates a pulse width increasing circuit 609 in accordance with an embodiment of the present invention.

FIG. 6 schematically illustrates a pulse width increasing circuit 609 in accordance with an embodiment of the present invention. The pulse width increasing circuit 609 comprises a diode D1, a resistor R1, a capacitor C1, a current source IS and a comparator COM1. The diode D1 has an anode and a cathode, wherein the anode is coupled to the output terminal of the OR gate OR1 to receive the first logic control signal CTRL1. The resistor R1 has a first terminal and a second terminal, wherein the first terminal is coupled to the anode of the diode D1, the second terminal is coupled to the cathode of the diode D1. The capacitor C1 has a first terminal and a second terminal, wherein the first terminal is coupled to the cathode of the diode D1, the second terminal is grounded. The current source IS has a first terminal, a second terminal and a control terminal, wherein the first terminal is coupled to the cathode of the diode D1, the second terminal is grounded, and the control terminal is coupled to the proportional sampling circuit 507 to receive the proportional sampling signal VC. The current provided by the current source IS is adjusted by the proportional sampling signal VC. In an embodiment, when the proportional sampling signal VC is smaller than zero, the current provided by the current source IS is constant. When the proportional sampling signal VC is larger than or equal to zero, the current provided by the current source IS varies along with the proportional sampling signal VC, wherein the current increases when the proportional sampling signal VC increases and vice versa. In some embodiments, the current is proportional with the proportional sampling signal VC when the proportional sampling signal VC is larger than or equal to zero, the current can be expressed as IS=k2*VC, wherein k2 is a constant value. The comparator COM1 has a non-inverting input terminal, an inverting input terminal and an output terminal, wherein the non-inverting terminal is coupled to the first terminal of the capacitor C1, the inverting input terminal is configured to receive a threshold voltage VTH. The comparator COM1 compares the voltage V1 across the capacitor C1 with the threshold voltage VTH and generates the sum control signal CTRLS at the output terminal.

Figure 7A:
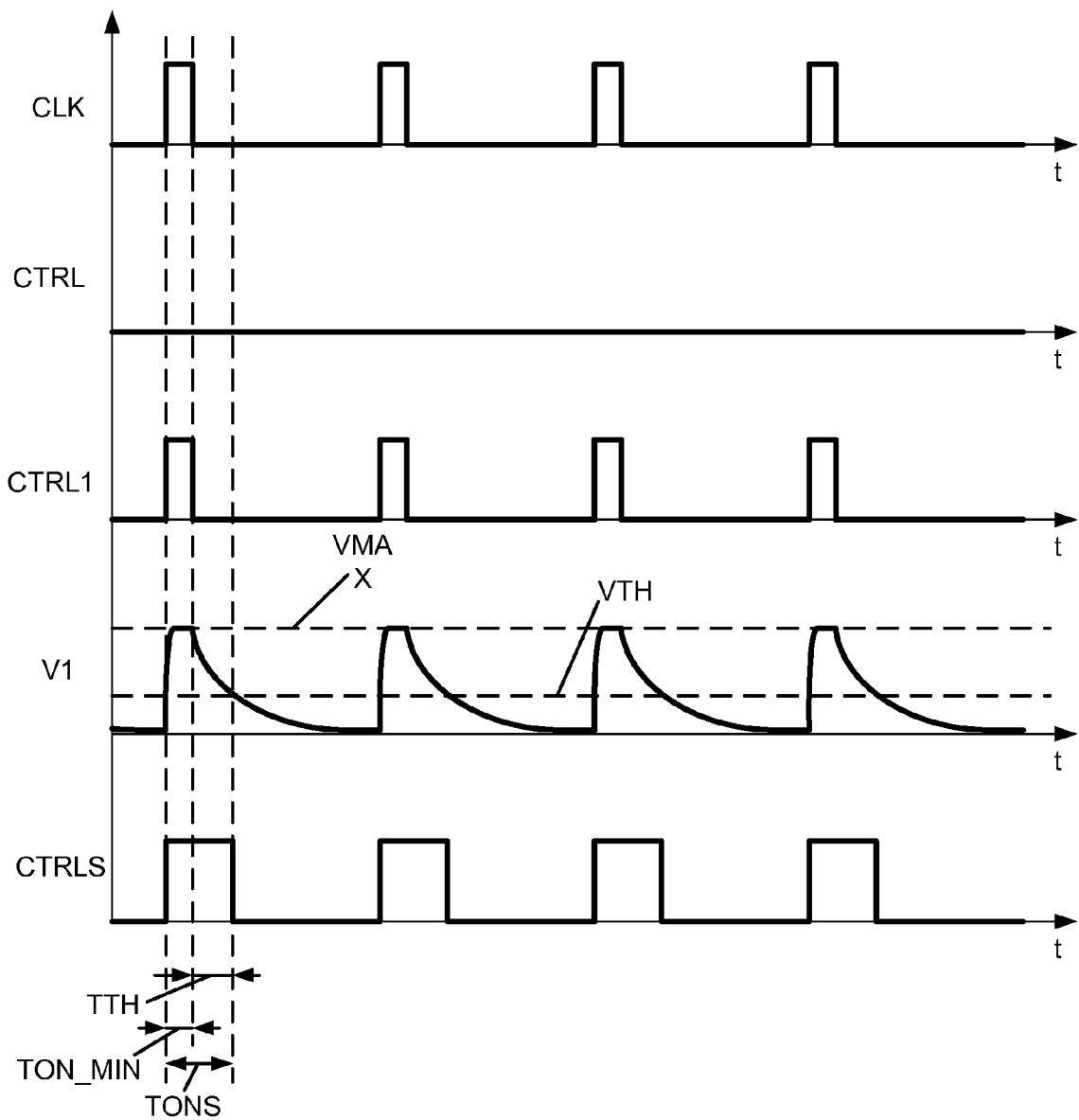
FIG. 7A-7C illustrate the working waveforms of the pulse width increasing circuit 609 shown in FIG. 6 in accordance with an embodiment of the present invention.

FIG. 7A illustrates the working waveforms of the pulse width increasing circuit 609 in BUCK mode in accordance with an embodiment of the present invention. In BUCK mode, the pulse width TON of the logic control signal CTRL is zero, the proportional sampling signal VC is larger than zero, the current provided by the current source IS is k2*VC. As shown in FIG. 7A, when the clock signal CLK is changed from logical low into logical high, the diode D1 is turned on. The capacitor C1 is charged through the diode D1, and the voltage V1 across the capacitor C1 is increased rapidly. When the voltage V1 is increased to reach the threshold voltage VTH, the sum control signal CTRLS is changed from logical low into logical high. The voltage V1 keeps increasing until it reaches a maximum voltage VMAX. When the clock signal CLK is changed from logical high into logical low, the diode D1 is turned off and the capacitor C1 is discharged through the resistor R1 and the current source IS. The voltage V1 is gradually decreased. When the voltage V1 is decreased to reach the threshold voltage VTH, the sum control signal CTRLS is changed from logical high into logical low. The discharge time of the capacitor C1 during which the voltage V1 decreases from the maximum voltage VMAX to the threshold voltage VTH is the modulation value TTH. According to the current-second balance law, the voltage V1 during discharge can be expressed as $$V1=(VMAX+R1*k2*VC)*e^{-t/(R1*C1)} R1*k2*VC \quad \text{(Formula 4)}$$

Then the modulation value TTH can be calculated as:

$$TTH=-R1*C1*\ln((VTH+R1*k2*VC)/(VMAX+R1*k2*VC)) \quad \text{(Formula 5)}$$

Based on the formula 5, we can get that the modulation value TTH varies reversely with the proportional sampling signal VC. It is decreased when the proportional sampling signal VC increases, and vice versa.

Figure 7B:
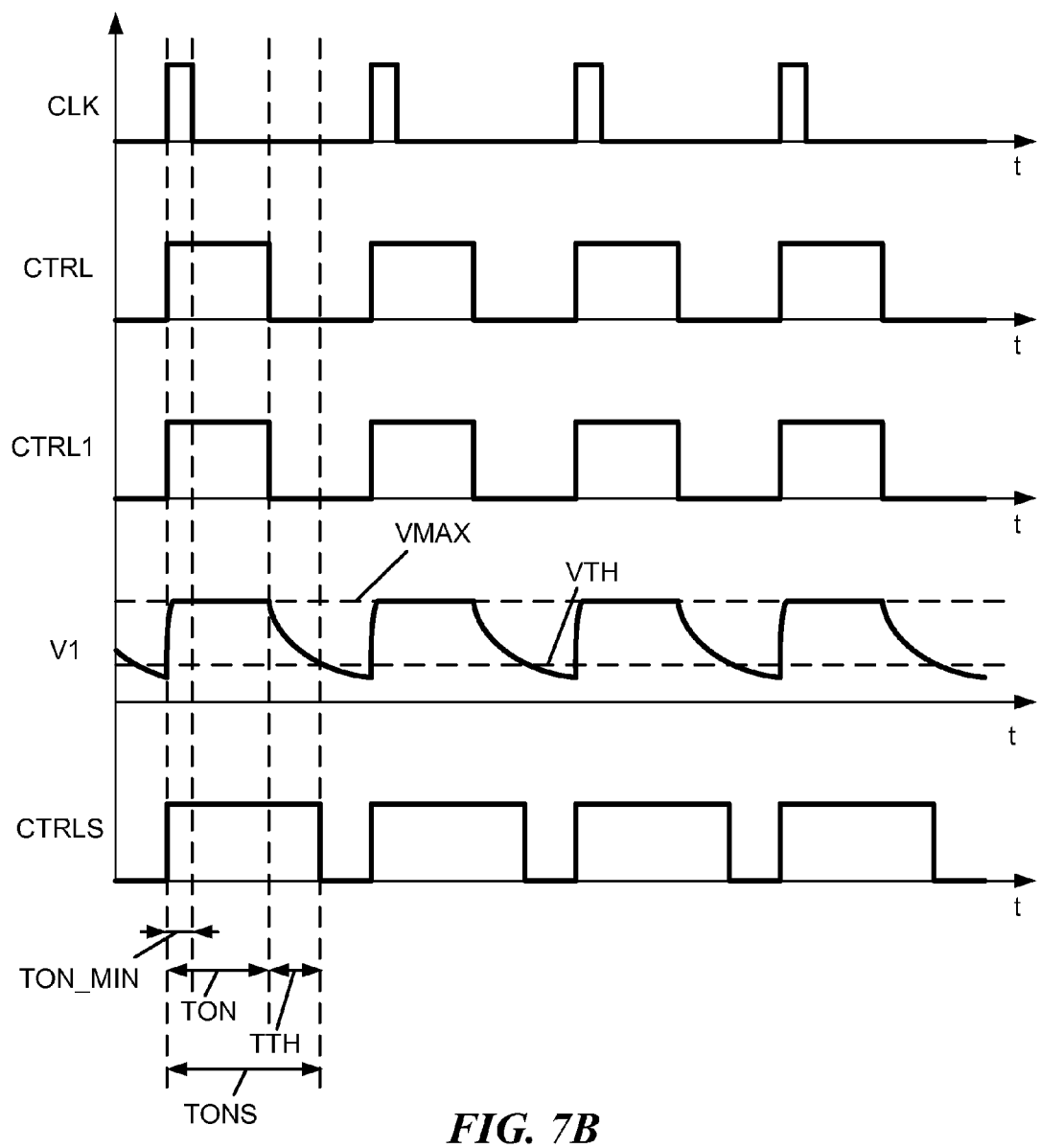

FIG. 7B illustrates the working waveforms of the pulse width increasing circuit 609 in BUCK-BOOST mode in accordance with an embodiment of the present invention. In BUCK-BOOST mode, the pulse width TON of the logic control signal CTRL is larger than zero and smaller than T-TTH. The proportional sampling signal VC is smaller than zero, the current provided by the current source IS is zero. As shown in FIG. 7B, when the logic control signal CTRL is changed from logical low into logical high, the diode D1 is turned on. The capacitor C1 is charged through the diode D1, and the voltage V1 across the capacitor C1 is increased rapidly. When the voltage V1 is increased to reach the threshold voltage VTH, the sum control signal CTRLS is changed from logical low into logical high. The voltage V1 keeps increasing until it reaches the maximum voltage VMAX. When the logic control signal CTRL is changed from logical high into logical low, the diode D1 is turned off and the capacitor C1 is discharged through the resistor R1. The voltage V1 is gradually decreased. When the voltage V1 is decreased to reach the threshold voltage VTH, the sum control signal CTRLS is changed from logical high into logical low. The discharge time of the capacitor C1 during which the voltage V1 decreases from the maximum voltage VMAX to the threshold voltage VTH is the modulation value TTH. According to the current-second balance law, the voltage V1 during discharge can be expressed as $$V1=VMAX*e^{-t/(R1*C1)} \quad \text{(Formula 6)}$$

Then the modulation value TTH can be calculated as:

$$TTH=-R1*C1*\ln(VTH/VMAX) \quad \text{(Formula 7)}$$

Based on the formula 7, we can get that the modulation value TTH is constant, and is determined by the maximum voltage VMAX, the threshold voltage VTH, the resistance of the resistor R1 and the capacitance of the capacitor C1.

Figure 7C:
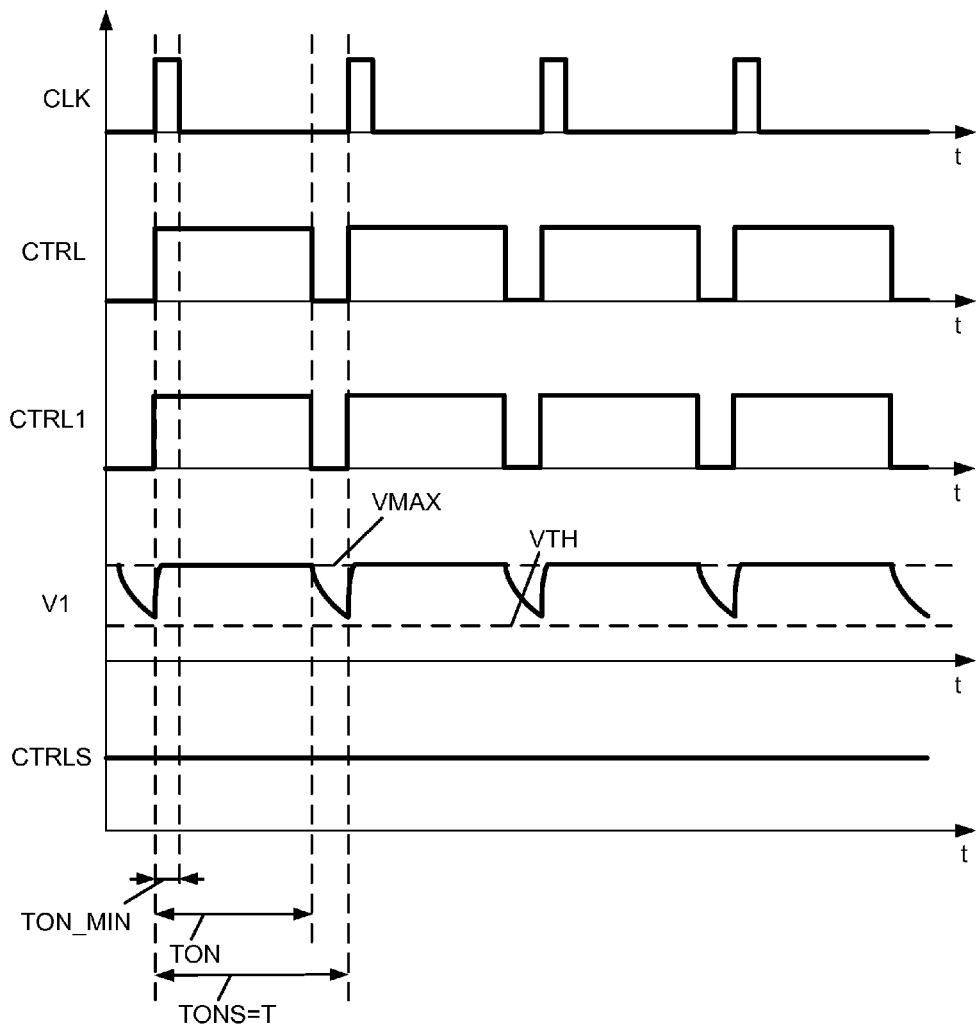

FIG. 7C illustrates the working waveforms of the pulse width increasing circuit 609 in BOOST mode in accordance with an embodiment of the present invention. In BOOST mode, the pulse width TON of the logic control signal CTRL is larger than T-TTH. The proportional sampling signal VC is smaller than zero, the current provided by the current source IS is zero. As shown in FIG. 7C, when the logic control signal CTRL is changed from logical low into logical high, the diode D1 is turned on. The capacitor C1 is charged through the diode D1, and the voltage V1 across the capacitor C1 is increased rapidly. When the voltage V1 is increased to reach the threshold voltage VTH, the sum control signal CTRLS is changed from logical low into logical high. The voltage V1 keeps increasing until it reaches the maximum voltage VMAX. When the logic control signal CTRL is changed from logical high into logical low, the diode D1 is turned off and the capacitor C1 is discharged through the resistor R1. The voltage V1 is gradually decreased. Since the logic control signal CTRL is changed from logical low into logical high before the voltage V1 decreases to reach the threshold voltage VTH, the voltage V1 increases again. As a result, the sum control signal CTRLS is maintained high, and its pulse width TONS is equal to T.

Figure 8:
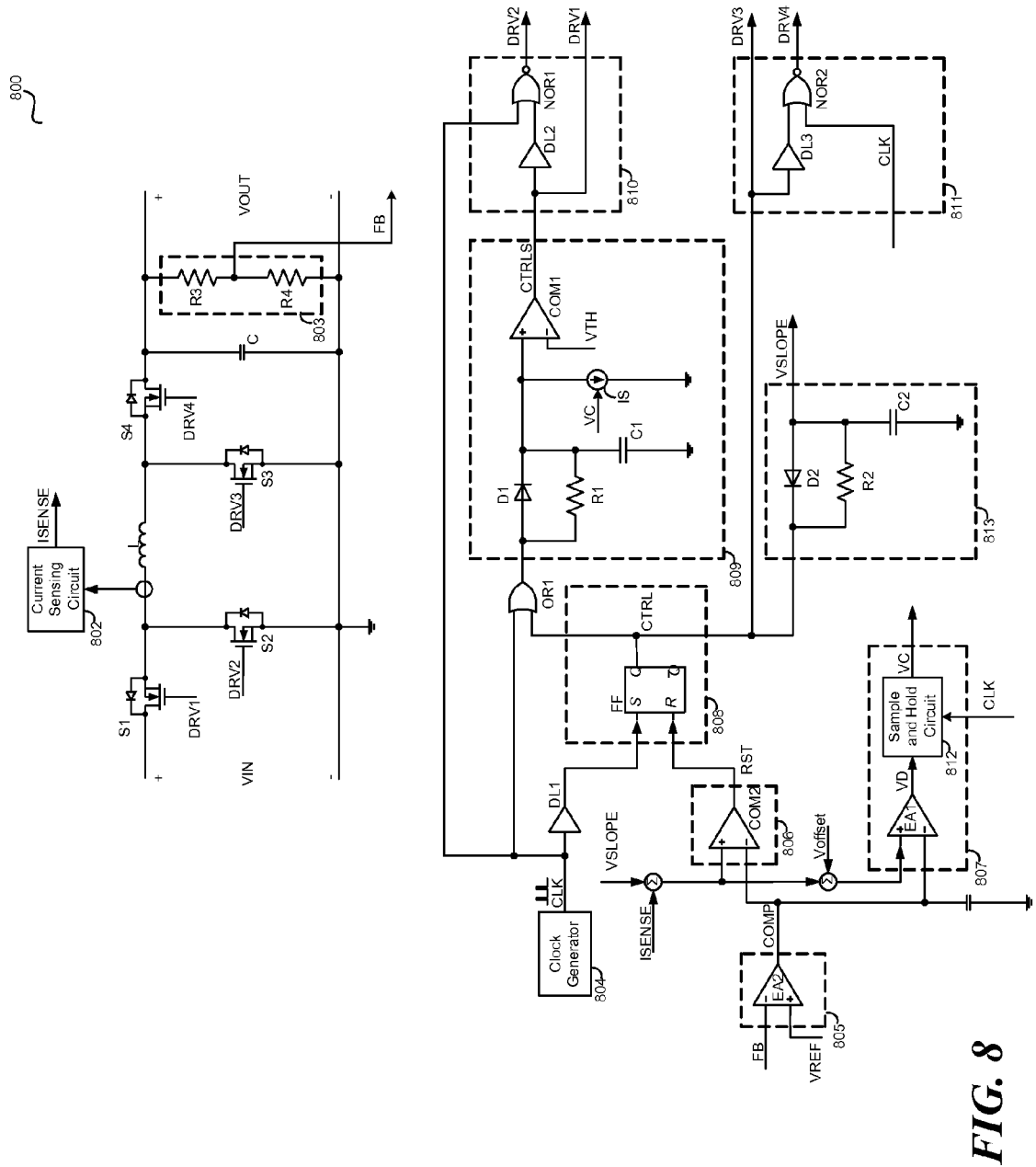
FIG. 8 schematically illustrates a buck-boost converter 800 in accordance with an embodiment of the present invention.

FIG. 8 schematically illustrates a buck-boost converter 800 in accordance with an embodiment of the present invention. The switches S1~S4 are all N type MOSFET. The feedback signal 803 comprises a resistor divider consisting of resistors R3 and R4. The error amplifying circuit 805 comprises an error amplifier EA2 having a non-inverting input terminal, an inverting input terminal and an output terminal. The non-inverting input terminal is configured to receive the reference signal VREF, the inverting input terminal is coupled to the feedback circuit 803 to receive the feedback signal FB. Based on the reference signal VREF and the feedback signal FB, the error amplifier EA2 generates the compensation signal COMP at the output terminal. The comparing circuit 806 comprises a comparator COM2 having a non-inverting input terminal, an inverting input terminal and an output terminal. The non-inverting input terminal is configured to receive the sum of the current sensing signal ISENSE and the ramp signal VSLOPE, the inverting input terminal is coupled to the output terminal of the error amplifier EA2 to receive the compensation signal COMP, the output terminal is configured to provide the reset signal RST.

The structure of the proportional sampling circuit 807 is similar to that shown in FIG. 4. The logic circuit 808 comprises a flip-flop FF having a set terminal, a reset terminal and an output terminal. The set terminal is coupled to the clock generator 804 to receive the clock signal CLK, the reset terminal is coupled to the output terminal of the comparator COM2 to receive the reset signal RST. Based on the clock signal CLK and the reset signal RST, the flip-flop FF generates the logic control signal CTRL at the output terminal. The flip-flop FF is set at the rising edge of the clock signal CLK, and is reset when the sum of the current sensing signal ISENSE and the ramp signal VSLOPE is larger than or equal to the compensation signal COMP. The flop-flop FF is reset dominate.

The structure of the pulse width increasing circuit 809 is substantially same with that shown in FIG. 6. The first driving circuit 810 comprises a delay circuit DL2 and a nor gate NOR1. As shown in FIG. 8, the clock signal CLK is sent into the flip-flop FF through a delay circuit DL1. The delay circuits DL1, DL2 and the nor gate NOR1 work together to generate the complementary driving signals DRV1 and DRV2 with sufficient dead time.

The second driving circuit 811 comprises a delay circuit DL3 and a nor gate NOR2, connected as shown in FIG. 8. The delay circuits DL3 and the nor gate NOR2 work together to generate the complementary driving signals DRV3 and DRV4 with sufficient dead time.

The ramp generator 813 comprises a diode D2, a resistor R2 and a capacitor C2. The diode D2 has an anode and a cathode, wherein the cathode is coupled to the logic circuit 808 to receive the logic control signal CTRL, the anode is configured to provide the ramp signal VSLOPE. The resistor R2 has a first terminal and a second terminal, wherein the first terminal is coupled to the cathode of the diode D2, the second terminal is coupled to the anode of the diode D2. The capacitor C2 has first terminal and a second terminal, wherein the first terminal is coupled to the anode of the diode D2, the second terminal is grounded. The ramp signal VSLOPE is a periodical saw-tooth signal when the pulse width TON of the logic control signal CTRL is larger than zero, and is equal to zero when the pulse width TON is zero.

Figure 9:
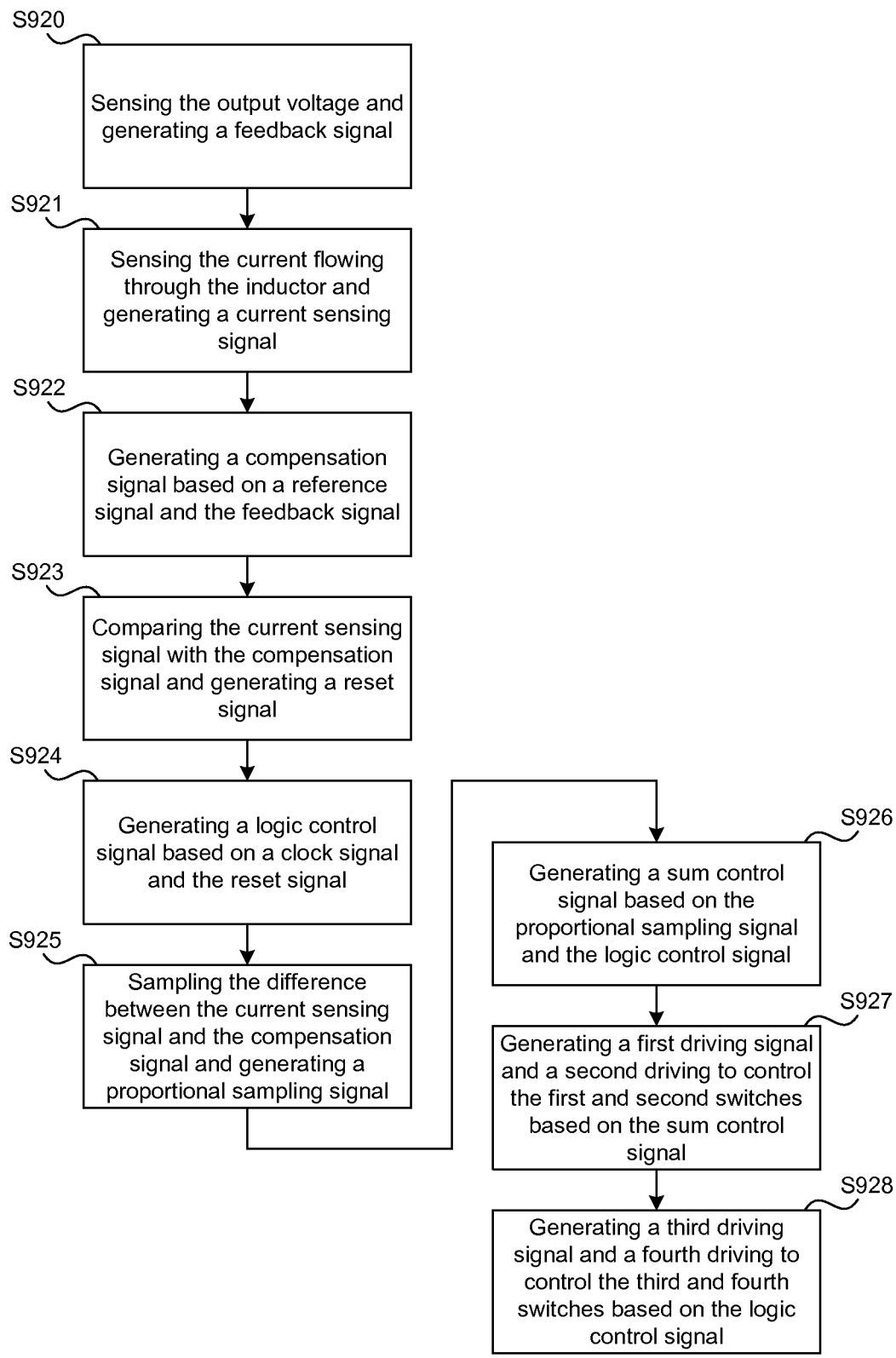
FIG. 9 is a working flowchart of a control method used in a buck-boost converter in accordance with an embodiment of the present invention.

FIG. 9 is a working flowchart of a control method used in a buck-boost converter in accordance with an embodiment of the present invention. It comprises steps S920~S928.

At the step S920, the output voltage is sensed and a feedback signal representative of the output voltage is generated.

At the step S921, the current flowing through the inductor is sensed and a current sensing signal representative of the current is generated.

At the step S922, a compensation signal is generated based on a reference signal and the feedback signal.

At the step S923, the current sensing signal is compared with the compensation signal to generate a reset signal.

At the step S924, a logic control signal is generated based on a clock signal and the reset signal.

At the step S925, the difference between the current sensing signal and the compensation signal is sampled based on the clock signal to generate a proportional sampling signal. In an embodiment, an offset signal is added to the current sensing signal in this step to facilitate the mode transition.

At the step S926, a sum control signal is generated based on the proportional sampling signal and the logic control signal, wherein the pulse width of the sum control signal is equal to the sum of the pulse width of the logic control signal and a modulation value adjusted by the proportional sampling signal. In an embodiment, the modulation value is constant when the proportional sampling signal is smaller than zero, and varies reversely with the proportional sampling signal when the proportional sampling signal is larger than zero.

At the step S927, a first driving signal and a second driving signal are generated based on the sum control signal to respectively control the first switch and the second switch.

At the step S928, a third driving signal and a fourth driving signal are generated based on the logic control signal to respectively control the third switch and the fourth switch.

In an embodiment, the control method further comprises adding a ramp signal to the current sensing signal. The ramp signal may be periodical saw-tooth or triangular signal. It may also be generated based on the logic control signal.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

I claim:

1. A controller used in a buck-boost converter, wherein the buck-boost converter converting an input voltage into an output voltage comprises a first switch, a second switch, a third switch, a fourth switch and an inductor, the controller comprises:

a clock generator configured to generate a periodical clock signal;

an error amplifying circuit configured to generate a compensation signal based on a reference signal and a feedback signal representative of the output voltage;

a comparing circuit coupled to the error amplifying circuit, wherein the comparing circuit is configured to compare a current sensing signal representative of the current flowing through the inductor with the compensation signal, and generate a reset signal;

a proportional sampling circuit coupled to the clock generator and the error amplifying circuit, wherein based on the clock signal, the proportional sampling circuit samples the difference between the current sensing signal and the compensation signal, and generates a proportional sampling signal;

a logic circuit coupled to the clock generator and the comparing circuit, wherein the logic circuit is configured to generate a logic control signal based on the clock signal and the reset signal;

a pulse width increasing circuit coupled to the proportional sampling circuit and the logic circuit, wherein the pulse width increasing circuit is configured to generate a sum control signal based on the proportional sampling signal and the logic control signal, and wherein the pulse width increasing circuit increases the pulse width of the logic control signal by a modulation value to generate the pulse width of the sum control signal, and the modulation value is adjusted by the proportional sampling signal;

a first driving circuit coupled to the pulse width increasing circuit, wherein based on the sum control signal, the first driving circuit generates a first driving signal and a second driving signal to respectively control the first switch and the second switch; and a second driving circuit coupled to the logic circuit, wherein based on the logic control signal, the second driving circuit generates a third driving signal and a fourth driving signal to respectively control the third switch and the fourth switch.

2. The controller of claim 1, wherein the modulation value is constant when the proportional sampling signal is smaller than zero, and varies reversely with the proportional sampling signal when the proportional sampling signal is larger than zero.

3. The controller of claim 1, further comprising:
an OR gate having a first input terminal, a second input terminal and an output terminal, wherein the first input terminal is coupled to the clock generator to receive the clock signal, the second input terminal is coupled to the logic circuit to receive the logic control signal, and the output terminal is coupled to the pulse width increasing circuit.

4. The controller of claim 1, wherein the pulse width increasing circuit comprises:
a diode having an anode and a cathode, wherein the anode is coupled to the logic circuit to receive the logic control signal;
a resistor having a first terminal and a second terminal, wherein the first terminal is coupled to the anode of the diode, the second terminal is coupled to the cathode of the diode;
a capacitor having a first terminal and a second terminal, wherein the first terminal is coupled to the cathode of the diode, the second terminal is grounded;
a current source having a first terminal, a second terminal and a control terminal, wherein the first terminal is coupled to the cathode of the diode, the second terminal is grounded, and the control terminal is coupled to the proportional sampling circuit to receive the proportional sampling signal; and
a comparator having a first input terminal, a second input terminal and an output terminal, wherein the first input terminal is coupled to the first terminal of the capacitor, the second input terminal is configured to receive a threshold voltage, and wherein the comparator compares the voltage across the capacitor with the threshold voltage and generates the sum control signal at the output terminal.

5. The controller of claim 4, wherein the current provided by the current source is constant when the proportional sampling signal is smaller than zero, and varies along with the proportional sampling signal when the proportional sampling signal is larger than zero.

6. The controller of claim 1, further comprising:
a ramp generator coupled to the logic circuit, wherein based on the logic control signal, the ramp generator generates a ramp signal added to the current sensing signal.

7. The controller of claim 1, wherein the proportional sampling circuit comprises:
an error amplifier having a first input terminal, a second input terminal and an output terminal, wherein the first input terminal is configured to receive the current sensing signal, the second input terminal is coupled to the error amplifying circuit to receive the compensation signal, wherein based on the current sensing signal and the compensation signal, the error amplifier generates a proportional error signal at the output terminal; and
a sample and hold circuit having a first input terminal, a second input terminal and an output terminal, wherein the first input terminal is coupled to the output terminal of the error amplifier to receive the proportional error signal, the second input terminal is coupled to the clock generator to receive the clock signal, and wherein based on the clock signal, the sample and hold circuit samples and holds the proportional error signal and generates the proportional sampling signal at the output terminal.

8. A buck-boost converter comprising:
a first switch having a first terminal, a second terminal and a control terminal, wherein the first terminal is configured to receive an input voltage;
a second switch having a first terminal, a second terminal and a control terminal, wherein the first terminal is coupled to the second terminal of the first switch, the second terminal is grounded;
an inductor having a first terminal and a second terminal, wherein the first terminal is coupled to the second terminal of the first switch and the first terminal of the second switch;
a third switch having a first terminal, a second terminal and a control terminal, wherein the first terminal is coupled to the second terminal of the inductor, the second terminal is grounded;
a fourth switch having a first terminal, a second terminal and a control terminal, wherein the first terminal is coupled to the second terminal of the inductor and the first terminal of the third switch, the second terminal is configured to provide an output voltage;
an output capacitor having a first terminal and a second terminal, wherein the first terminal is coupled to the second terminal of the fourth switch, the second switch is grounded;
a current sensing circuit configured to sense the current flowing through the inductor and generate a current sensing signal;
a feedback circuit coupled to the second terminal of the fourth switch, wherein the feedback circuit is configured to generate a feedback signal representative of the output voltage;
a clock generator configured to generate a periodical clock signal;
an error amplifying circuit coupled to the feedback circuit, wherein the error amplifying circuit is configured to generate a compensation signal based on a reference signal and the feedback signal;
a comparing circuit coupled to the current sensing circuit and the error amplifying circuit, wherein the comparing circuit is configured to compare the current sensing signal with the compensation signal and generate a reset signal;
a proportional sampling circuit coupled to the current sensing circuit, the clock generator and the error amplifying circuit, wherein based on the clock signal, the proportional sampling circuit samples the difference between the current sensing signal and the compensation signal, and generates a proportional sampling signal;
a logic circuit coupled to the clock generator and the comparing circuit, wherein the logic circuit is configured to generate a logic control signal based on the clock signal and the reset signal;
a pulse width increasing circuit coupled to the proportional sampling circuit and the logic circuit, wherein the pulse width increasing circuit is configured to generate a sum control signal based on the proportional sampling signal and the logic control signal, and wherein the pulse width increasing circuit increases the pulse width of the logic control signal by a modulation value to generate the pulse width of the sum control signal, and the modulation value is adjusted by the proportional sampling signal;
a first driving circuit coupled to the pulse width increasing circuit, wherein based on the sum control signal, the first driving circuit generates a first driving signal and a second driving signal to respectively control the first switch and the second switch; and a second driving circuit coupled to the logic circuit, wherein based on the logic control signal, the second driving circuit generates a third driving signal and a fourth driving signal to respectively control the third switch and the fourth switch.

9. The buck-boost converter of claim 8, wherein the modulation value is constant when the proportional sampling signal is smaller than zero, and varies reversely with the proportional sampling signal when the proportional sampling signal is larger than zero.

10. The buck-boost converter of claim 8, further comprising:

an OR gate having a first input terminal, a second input terminal and an output terminal, wherein the first input terminal is coupled to the clock generator to receive the clock signal, the second input terminal is coupled to the logic circuit to receive the logic control signal, and the output terminal is coupled to the pulse width increasing circuit.

11. The buck-boost converter of claim 8, wherein the pulse width increasing circuit comprises:

a diode having an anode and a cathode, wherein the anode is coupled to the logic circuit to receive the logic control signal;

a resistor having a first terminal and a second terminal, wherein the first terminal is coupled to the anode of the diode, the second terminal is coupled to the cathode of the diode;

a capacitor having a first terminal and a second terminal, wherein the first terminal is coupled to the cathode of the diode, the second terminal is grounded;

a current source having a first terminal, a second terminal and a control terminal, wherein the first terminal is coupled to the cathode of the diode, the second terminal is grounded, and the control terminal is coupled to the proportional sampling circuit to receive the proportional sampling signal; and a comparator having a first input terminal, a second input terminal and an output terminal, wherein the first input terminal is coupled to the first terminal of the capacitor, the second input terminal is configured to receive a threshold voltage, and wherein the comparator compares the voltage across the capacitor with the threshold voltage and generates the sum control signal at the output terminal.

12. The buck-boost converter of claim 11, wherein the current provided by the current source is constant when the proportional sampling signal is smaller than zero, and varies along with the proportional sampling signal when the proportional sampling signal is larger than zero.

13. The buck-boost converter of claim 8, further comprising:

a ramp generator coupled to the logic circuit, wherein based on the logic control signal, the ramp generator generates a ramp signal added to the current sensing signal.

14. The buck-boost converter of claim 8, wherein the proportional sampling circuit comprises:

an error amplifier having a first input terminal, a second input terminal and an output terminal, wherein the first input terminal is coupled to the current sensing circuit to receive the current sensing signal, the second input terminal is coupled to the error amplifying circuit to receive the compensation signal, wherein based on the current sensing signal and the compensation signal, the error amplifier generates a proportional error signal at the output terminal;

a sample and hold circuit having a first input terminal, a second input terminal and an output terminal, wherein the first input terminal is coupled to the output terminal of the error amplifier to receive the proportional error signal, the second input terminal is coupled to the clock generator to receive the clock signal, and wherein based on the clock signal, the sample and hold circuit samples and holds the proportional error signal and generates the proportional sampling signal at the output terminal.

15. A control method of a buck-boost converter, wherein the buck-boost converter converting an input voltage into an output voltage comprises a first switch, a second switch, a third switch, a fourth switch and an inductor, the control method comprises:

sensing the output voltage and generating a feedback signal;

sensing the current flowing through the inductor and generating a current sensing signal;

generating a compensation signal based on a reference signal and the feedback signal;

comparing the current sensing signal with the compensation signal and generating a reset signal;

generating a logic control signal based on a clock signal and the reset signal;

sampling the difference between the current sensing signal and the compensation signal based on the clock signal and generating a proportional sampling signal;

generating a sum control signal based on the proportional sampling signal and the logic control signal, wherein the pulse width of the sum control signal is equal to the sum of the pulse width of the logic control signal and a modulation value adjusted by the proportional sampling signal;

generating a first driving signal and a second driving signal based on the sum control signal to respectively control the first switch and the second switch; and generating a third driving signal and a fourth driving signal based on the logic control signal to respectively control the third switch and the fourth switch.

16. The control method of claim 15, wherein the modulation value is constant when the proportional sampling signal is smaller than zero, and varies reversely with the proportional sampling signal when the proportional sampling signal is larger than zero.

17. The control method of claim 15, further comprising:

generating a ramp signal based on the logic control signal; and adding the ramp signal to the current sensing signal.

18. The control method of claim 15, wherein an offset signal is added to the current sensing signal in the step of generating the proportional sampling signal.

* * * * *